April 17, 1951     E. C. KIEKHAEFER     2,549,482
INTERNAL-COMBUSTION ENGINE
Filed Jan. 13, 1949     6 Sheets-Sheet 1

INVENTOR.
Elmer C. Kiekhaefer
BY
Andrus & Stealer
Attorneys

April 17, 1951 E. C. KIEKHAEFER 2,549,482
INTERNAL-COMBUSTION ENGINE
Filed Jan. 13, 1949 6 Sheets-Sheet 2

INVENTOR.
Elmer C. Kiekhaefer
BY
Andrus & Scales
Attorneys

April 17, 1951 — E. C. KIEKHAEFER — 2,549,482
INTERNAL-COMBUSTION ENGINE
Filed Jan. 13, 1949 — 6 Sheets-Sheet 3

INVENTOR.
Elmer C. Kiekhaefer
BY Andrus & Sceales
Attorneys

April 17, 1951 E. C. KIEKHAEFER 2,549,482
INTERNAL-COMBUSTION ENGINE
Filed Jan. 13, 1949 6 Sheets-Sheet 4

INVENTOR.
Elmer C. Kiekhaefer
BY Andrus & Nielsen
Attorneys

April 17, 1951  E. C. KIEKHAEFER  2,549,482
INTERNAL-COMBUSTION ENGINE
Filed Jan. 13, 1949  6 Sheets-Sheet 5

INVENTOR.
Elmer C. Kiekhaefer
BY
Andrus & Nealer
Attorneys

April 17, 1951  E. C. KIEKHAEFER  2,549,482
INTERNAL-COMBUSTION ENGINE
Filed Jan. 13, 1949  6 Sheets-Sheet 6
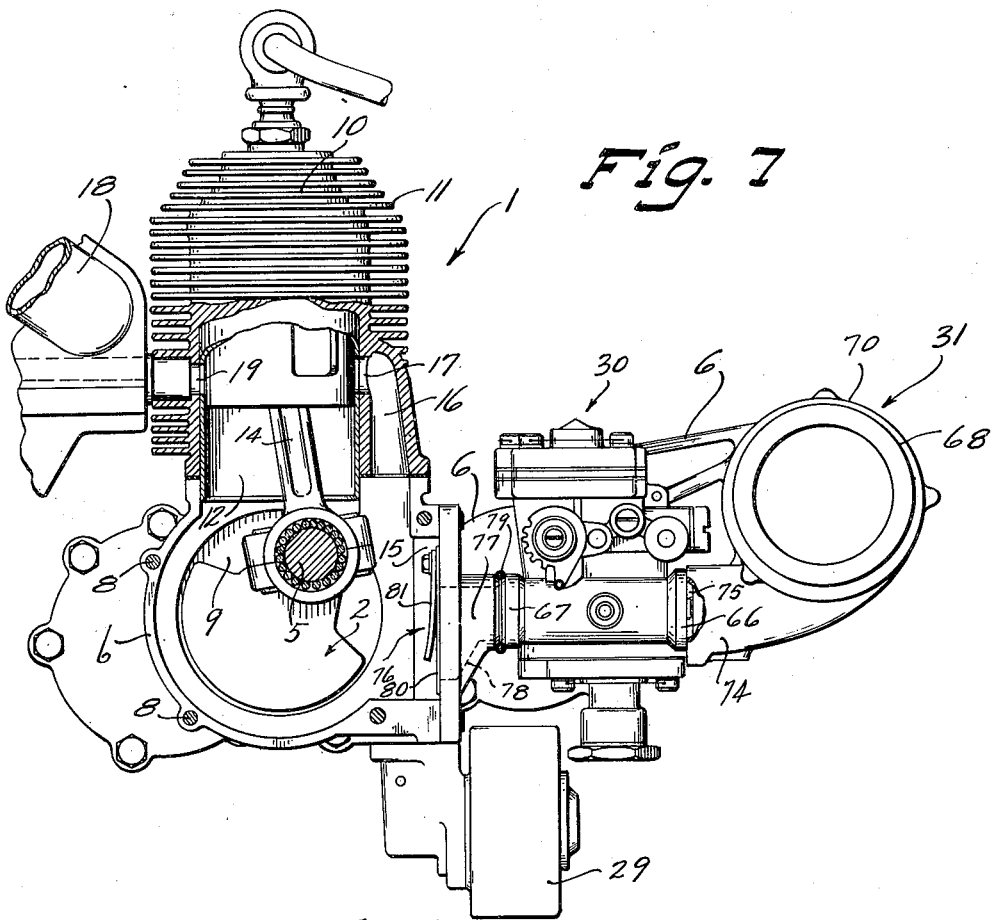
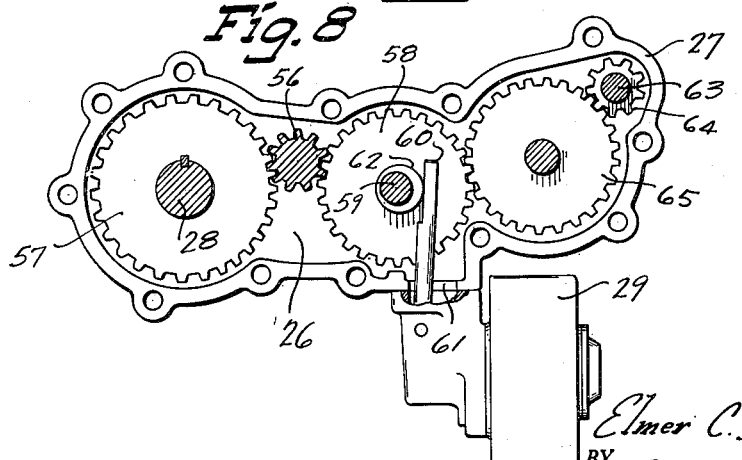
INVENTOR.
Elmer C. Kiekhaefer
BY
Andrus & Sceales
Attorneys Patented Apr. 17, 1951

2,549,482

UNITED STATES PATENT OFFICE 2,549,482

INTERNAL-COMBUSTION ENGINE

Elmer C. Kiekhaefer, Cedarburg, Wis.

Application January 13, 1949, Serial No. 70,733

16 Claims. (Cl. 123—73)

This invention relates to internal combustion engines and particularly to engines of small size.

A principal object of the invention is to provide a lightweight and compact arrangement of parts of an internal combustion engine adapted to industrial applications which require both portability and dependability of operation under severe or adverse conditions of service.

Another object is to provide a low-weight-per-horsepower ratio in a compact, portable engine which will also withstand rough handling and the like without damage.

Another object is to provide for the easy disassembly of a part of such an engine and fuel system therefor for purposes of repair, cleaning or adjustment of the same without requiring the disassembly of another part of or the entire engine.

Another object is to provide for the operative support of all the elements of a rewind hand-started, air-cooled, magneto-ignition engine while employing a single shaft carried by bearings entirely disposed within the transmission case and crankcase of the engine.

Another object is to provide for the more complete interchangeability of unit assemblies, parts and castings of comparable engines of one and two or more cylinders.

These and other objects and advantages will be more fully set forth in the following description of a preferred embodiment of the invention illustrated in the accompanying drawings.

Figure 1:
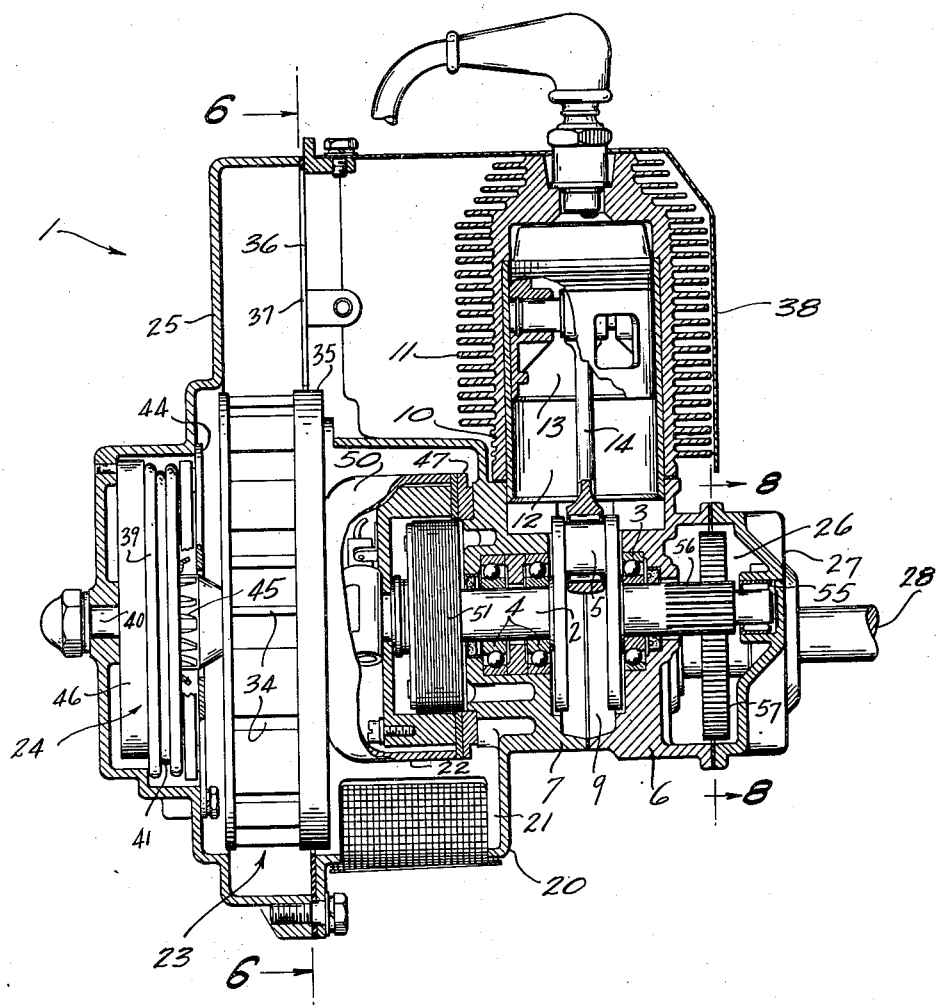
Figure 1 is a vertical section of the one cylinder engine embodiment of the invention.
Figure 2:
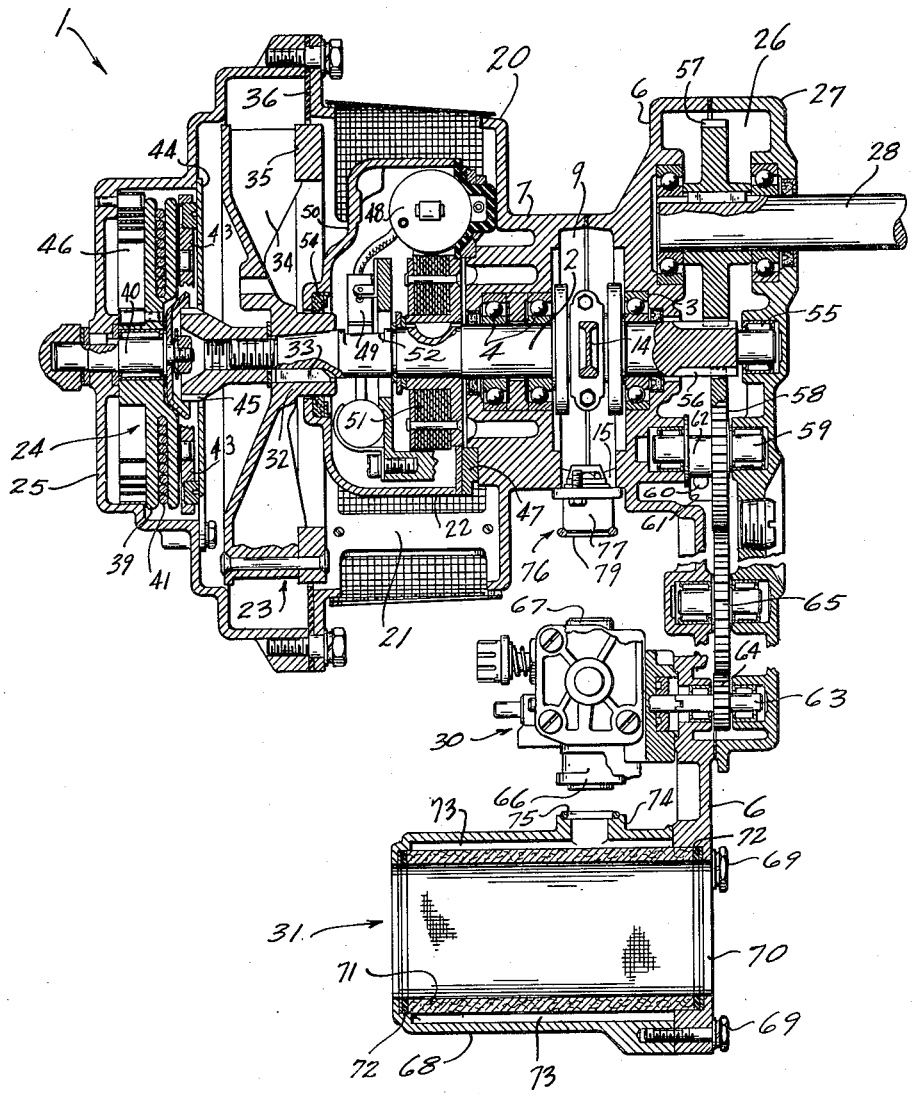
Fig. 2 is a horizontal section of the engine taken axially of the crankshaft on line 2—2 of Fig. 1 and showing the elements of the engine fuel system in their relative position.
Figure 3:
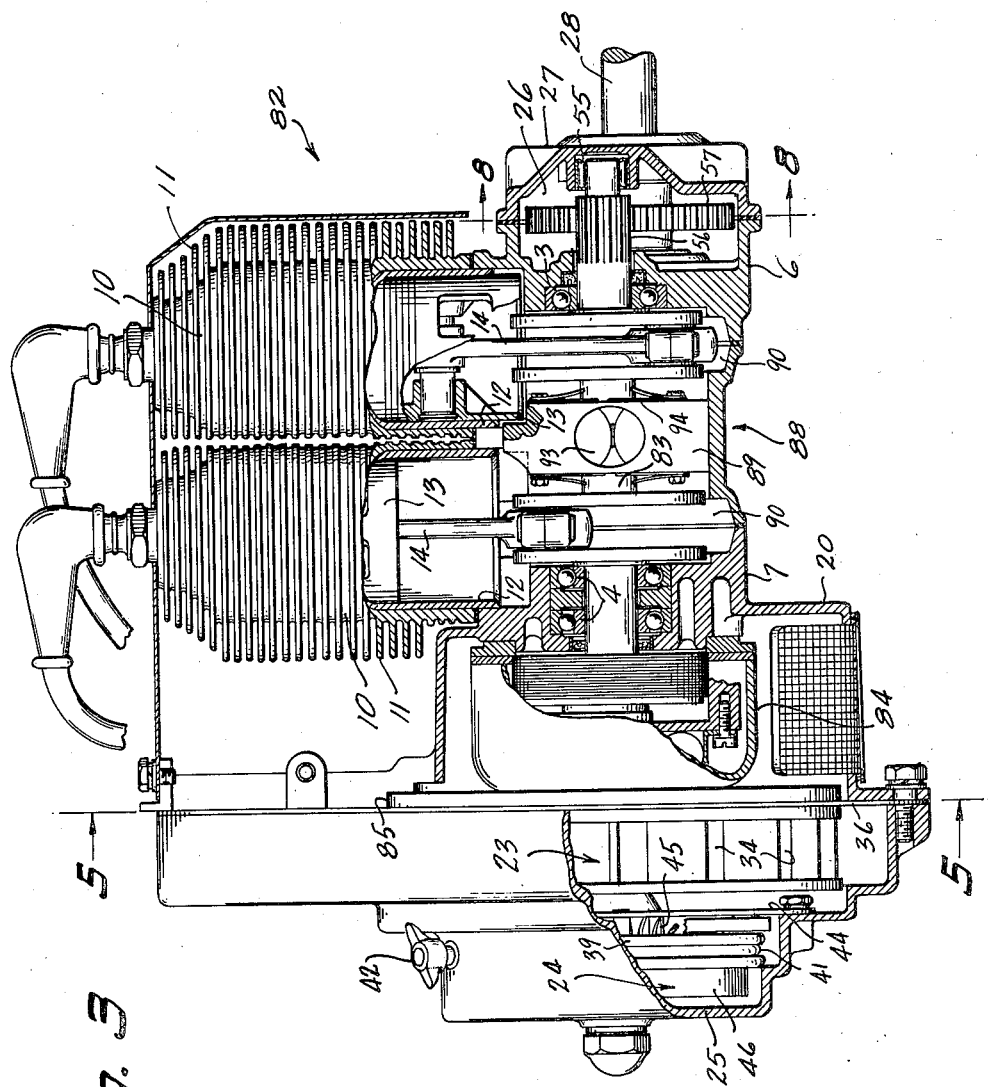
Fig. 3 is a side elevation of a two cylinder engine with parts broken away and sectioned.

Fig. 7 is a view in side elevation of the engine fuel system for the engine shown in Figs. 1 and 2 with parts broken away and sectioned; and Fig. 8 is a sectional view taken on line 8—8 of Figs. 1 and 3 and showing the relative location of the fuel pump and crankcase.

The air cooled, two-cycle single cylinder internal combustion engine 1 shown in Figs. 1 and 2 has a single thrown crankshaft 2 journaled in the single and double bearings 3 and 4 respectively on opposite sides of the crank 5.

The two cast complementary half sections 6 and 7 of the engine crankcase are joined circumferentially of crankshaft 2 by the bolts 8 and support the crankshaft in bearings 3 and 4 respectively and define the crank chamber 9.

The cast cylinder block 10 having radially extending fins 11 for air cooling of the cylinder is bolted to the flat upper side of sections 6 and 7 with the steel cylinder insert 12 extending between crankcase sections 6 and 7 and into crank chamber 9. The piston 13 within cylinder sleeve 12 is connected to crank 5 by the connecting rod 14.

The opening 15 mutually provided by sections 6 and 7 provides for the entry of carbureted air into crank chamber 9 for pre-compression by piston 13 prior to transfer through passage 16 and ports 17 to the cylinder for combustion.

The exhaust muffler 18 is secured to one side of cylinder 10 and receives the combustion exhaust gases through ports 19 from the cylinder.

Ports 17 and 19 are controlled by piston 13 as in the operation of conventional two-cycle engines.

The cast section 7 forming one half of the crank chamber 9 is provided with the cowl portion 20 formed integrally therewith and which defines one half of the chamber 21 housing the magneto 22, air impeller 23 and starter unit 24. The cast end closure member 25 is secured to cowl 20 to close chamber 21 and receives the air from impeller 23 to direct the same over cowl 20 to the fins 11 of cylinder 10 as will be described.

The cast section 6 forming the other half of the crank chamber 9 extends on opposite sides of the engine to define one half of the transmission chamber 26. The cast end closure member 27 is secured to crankcase section 6 to close transmission chamber 26, and with section 6 carries the output shaft 28, the fuel pump 29, and the carbureting unit 30 operated through gears by the engine, as will be described. The air filter unit 31 is carried by crankcase section 6 at the extreme end of chamber 26 in operative relation to carbureting unit 30, as will also be described.

The impeller 23 for cooling of cylinder 10 is mounted near the end of shaft 2 supported by the double row of bearings 4. The hub 32 of impeller 23 is secured rotationally to shaft 2 by the key 33.

Figure 6:
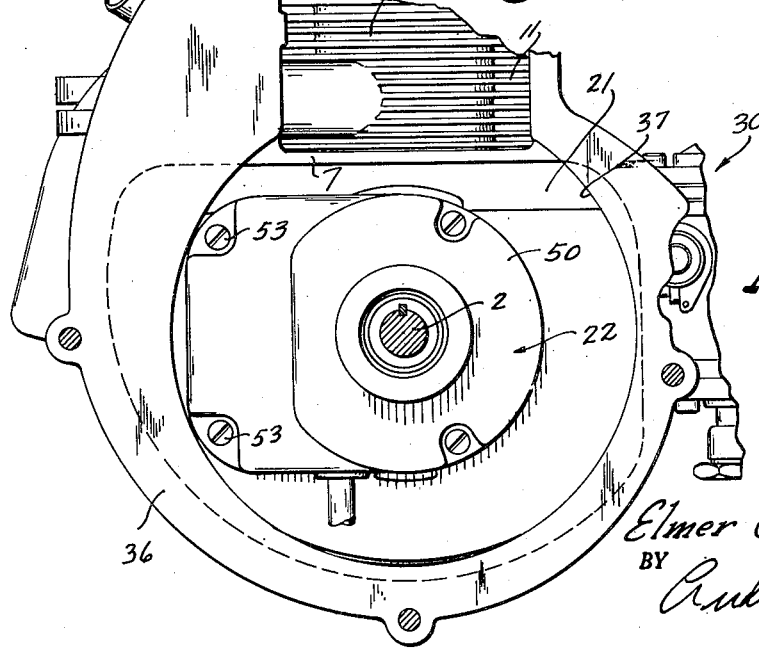
Fig. 6 is a transverse vertical section taken on line 6—6 of Fig. 1 through the intermediate crankcase member and center crankshaft bearing.

The vanes 34 of impeller 23 formed integrally with the closed body of the impeller extend radially from hub 32 to carry the ring 35 which provides the desired flywheel inertia to the impeller. A thin plate 36 is shaped as shown in Fig. 6 to fit the scroll shaped closure member 25 and cowl 20, and is disposed therebetween in a plane normal to the axis of crankshaft 2. The central round opening 37 in plate 36 is extended upwardly above cowl 20, and the impeller 23 is disposed within chamber 21 with ring 35 fitting closely within the lower circular portion of opening 37 to receive the air entering chamber 21 through the screened openings in cowl 20 on one side of plate 36 and to discharge the air radially into scroll member 25 on the opposite side of plate 36. The shield 38 receives the discharged air passing from scroll member 25 through the upper portion of opening 37 above cowl 20 and extends over cylinder 10 to direct the air over fins 11 of the cylinder.

The starter unit 24 comprises the sheave 39 rotatably mounted on the shaft 40 carried by scroll member 25 opposite the end of crankshaft 2. The cable 41 carried by sheave 39 is unwound by pulling manually the handle 42 (shown in Fig. 3) to rotate sheave 39 in the direction of engine rotation. The pawls 43 are carried by sheave 39 in frictional engagement with plate 44 to effect upon the initial rotational movement of the sheave radially inward engagement of pawls 43 with the ratchet wheel 45 carried by crankshaft 2. The spring 46 serves to rewind cable 41 on sheave 39 at the completion of each starting stroke.

The ignition magneto 22 includes the base plate 47 carrying the coil and stator 48, the timing circuit 49 and the cover 50. The rotor 51 and cam 52 are carried by crankshaft 2 extending through base plate 47 and cover 50. Magneto 22 is disposed within cowl 20 opposite vanes 34 and between impeller 23 and crank chamber 9.

The magneto is adjustably secured to crankcase 7 to allow limited rotative movement of the magneto about the axis of crankshaft 2 for adjustment of the timing circuit 49 with respect to cam 52 and the rotation of crankshaft 2.

The cover 50 is secured by bolts 53 to base plate 47 to enclose the magneto, and fits over impeller hub 32 and carries the felt seal 54 to prevent foreign particles from entering and interfering with the operation of the magneto.

The end of crankshaft 2 opposite impeller 23 and extending into transmission chamber 26 is journaled in the bearing 55 carried by transmission cover 27 and is formed to provide the pinion 56 between bearings 3 and 55. The gear 57 carried by shaft 28 within chamber 26 meshes with pinion 56 to transmit the power of the engine to output shaft 28 as required.

The gear 58 meshing with pinion 56 oppositely of gear 57 is carried on the stub shaft 59. The fuel pump 29 receiving fuel from a tank, not shown, is carried by members 6 and 27 beneath transmission chamber 26. The oscillating operating lever 60 of pump 29 extends upwardly through opening 61 into chamber 26 to engage the cam 62 carried by shaft 59 on one side of gear 58 for operation of the pump.

The shaft 63 carrying the gear 64 is driven by means of the idler gear 65 engaging gears 58 and 64. The fuel carbureting unit 30 secured to crankcase-transmission member 6 and operated by shaft 63 includes a carbureting passage having opposite air intake and discharge ports 66 and 67 respectively and receives the fuel from fuel pump 29 through suitable connections, not shown.

The air filter unit 31 comprises an outer cylindrical shell 68 having open ends and which is secured by bolts 69 at one end to the open ring 70 formed integrally with the cast crankcase transmission member 6. The cylindrical filter 71 is disposed within shell 68 and carried at opposite ends by the shoulder portions 72 in the shell and ring. The diameter of filter 71 is less than shell 67 so as to provide an annular space 73 therebetween.

The air entering unit 31 passes through either open end of shell 68 to the inside of filter 71. The air then passes outwardly through filter 71 into the annular space 73. The discharge nozzle 74 formed integrally with shell 68 carries the recessed ring seal 75 in the end thereof which registers with the intake port 66 of the carbureting unit 30.

The valve unit 76 which controls the entry of air to crank chamber 9 through opening 15 comprises the member 77 which is bolted to crankcase members 6 and 7 over opening 15 and is provided with the intake conduit 78 which latter is arranged to register with the discharge port 67 of the carbureting unit 30. The ring seal 79 is carried outwardly between the beveled ends of units 78 and 30.

The reed 80 secured to the inside face of member 77 in opening 15 covers the inner end of conduit 78 to close the same normally and to be opened in response to the reduced pressure within crank chamber 9 in the induction cycle of the engine. The rocker arm 81 is rigidly carried by member 77 to limit the opening of reed 80.

Figure 4:
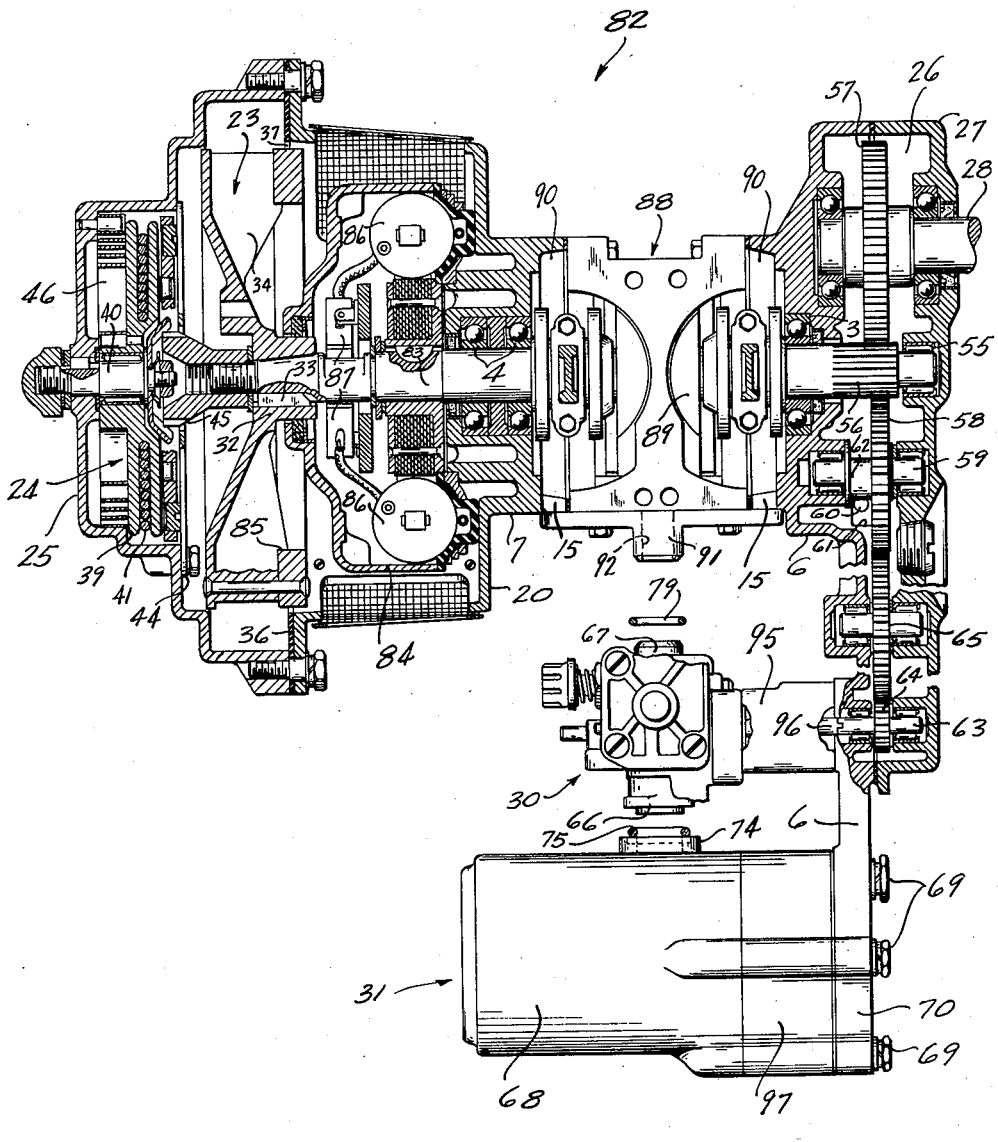
Fig. 4 is a view generally similar to Fig. 2 of the two-cylinder engine shown in Fig. 3.
Figure 5:
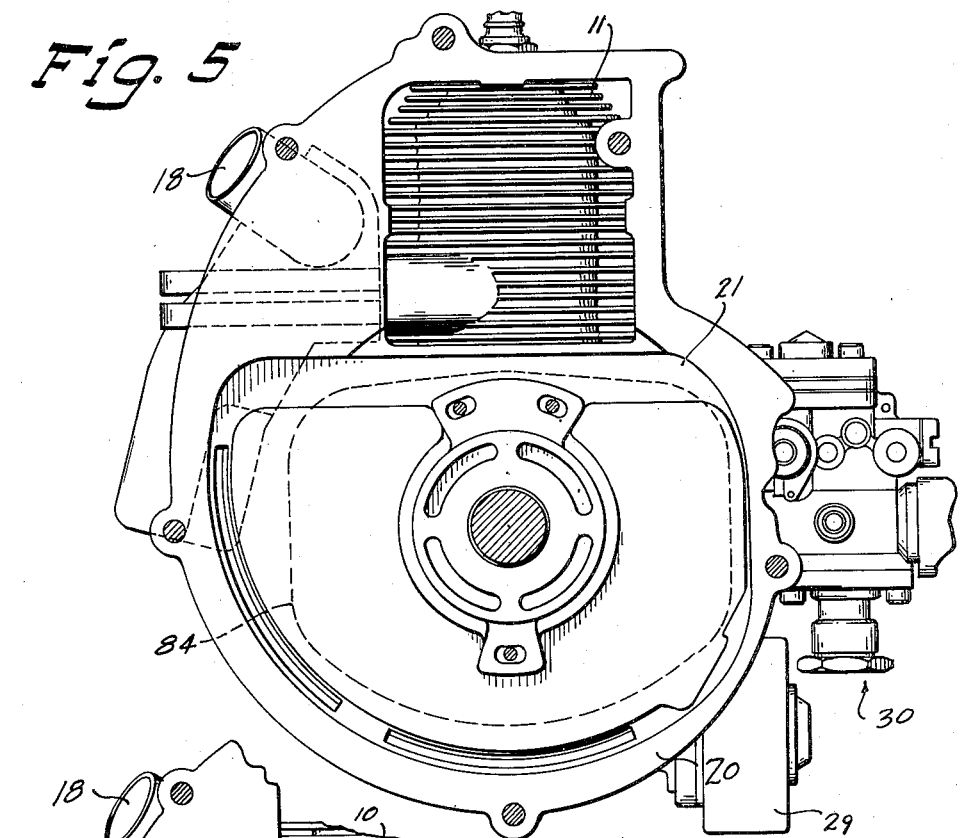
Fig. 5 is a transverse vertical section of the engine shown in Figs. 3 and 4 taken on line 5—5 of Fig. 3.

The two-cylinder engine 82 shown in Figs. 3 and 4 is comprised of parts identical to that shown in Figs. 1 and 2 with the exception of the crankshaft 83, the magneto 84 and certain few additional parts only, as will be described.

The impeller 23 may be provided with the flywheel ring 85 of less weight as required in the two-cylinder engine. The magneto 84 comprises the two stators 86 and timing circuits 87 for the individual cylinders. The crankshaft 83 is provided with two cranks spaced 180° which carry the two connecting rods 14 and pistons 13.

The additional crankcase section 88 interposed between members 6 and 7 with the latter carries the two cylinders 10 in parallel relation. The adjacent portions of fins 11 are removed by machining to prevent interference.

The split center main bearing 89 supporting the center of crankcase 83 is carried within section 88 and divides the crankcase into separate crank chambers 90.

The cover plate 91 secured to sections 6, 7 and 87 closes the openings 15 in sections 6 and 7 on either side of section 88 and is provided with the intake passage 92. The passages 93 in bearing 89 join radially to register with passage 92 and open into the respective crank chambers 90. The reed valves 94 carried by bearing member 89 control the passages 93 as in the single valve unit 76 described above.

The spacer 95 disposed between crankcase section 6 and the carbureting unit 30 supports the latter and carries the additional shaft 96 so that port 67 registers with passage 92 of cover plate 91.

The cylindrical spacer member 97 serves to support shell 68 so that the discharge nozzle 74 registers with intake port 66 of carbureting unit 30.

In engine 1, the relative in-line position of the engine carburetor unit 30 and air filter 31 allows either to be removed separately of the other by displacing ring seals 75 or 79. Similarly, in engine 82, the carburetor 30 and combined air filters 31 and 97 may be removed separately of each other.

The end of crankshaft 2 and pinion 56 supported by bearing 55 may be withdrawn from transmission chamber 26 without opening the chamber so that in both engines the entire transmission and fuel supply components including the carbureting device 30, air filter 31 and fuel pump 29 comprise a separable unit and which with the addition or removal of spacers 95 and 97 is interchangeable with either engine.

The starter unit 24 and scroll member 25 are similarly interchangeable in engines 1 and 82.

Removal of member 25 renders the flywheel-impeller 23 and magneto within cowl 20 immediately accessible and without disturbing any other parts of the engine.

The magnetos are disposed near the double of bearings 4 in either engine so that the accurate timing is maintained. The arrangement of the impeller within cowl 20 facing the magneto provides a more compact arrangement of the parts particularly where the starter unit 24 is necessarily located at the end of the crankshaft.

The interchangeability of parts reduces the inventory required by the manufacturer and service representatives. Maintenance and servicing of both engines are substantially identical requiring no additional personnel training or tools.

The engines are readily adaptable to numerous industrial applications requiring engines of particular specifications.

Various embodiments of the invention may be employed within the scope of the accompanying claims.

I claim:

1. In an internal combustion engine having a crankshaft and a piston, a crankcase for said crankshaft comprising separable cast complementary base members, cast closure members secured to the opposite end walls of said crankcase and defining with said base members chambers enclosing opposite ends of said crankshaft, and a cylinder for said piston jointly supported by said base members.

2. In an internal combustion engine having a crankshaft, a cylinder, and a piston carried within said cylinder and connected to said crankshaft between the ends thereof, separable cast complementary crankcase members jointly supporting said cylinder and rotatably carrying said crankshaft, means securing said members together at their inner ends on a parting line therebetween lying in a plane normal to the axis of the crankshaft, and cast housing members secured to the outer ends of the respective crankcase members and defining therewith a chamber at each end of said crankcase and enclosing the corresponding ends of said crankshaft.

3. An internal combustion engine comprising a crankshaft, an air-cooled cylinder, a piston movable within said cylinder and connected to said crankshaft between the ends thereof, a starter unit disposed adjacent one end of said crankshaft to engage the same for starting said engine, an air impeller carried by said end of said crankshaft and disposed to receive air on the side opposite said starter unit and discharge air centrifugally, a magneto operably mounted upon said crankshaft adjacent said impeller, an induction control valve operating in timed relation with said crankshaft, a fuel charge forming device disposed to communicate with said valve, an air filter intake device communicating with said charge forming device, separable complementary members carrying said crankshaft, said cylinder, and said control valve, a scroll member supported by one of said crankcase members and carrying said starter unit and disposed to enclose said impeller and receive therefrom and direct the air to the exterior of said cylinder, a removable closure member providing a transmission housing with and secured to the other of said crankcase members disposed to carry said air intake and charge forming devices, and a transmission gear mechanism within said transmission housing connecting said crankshaft and charge forming device to operate the latter.

4. In an internal combustion engine having a crankshaft, an air-cooled cylinder, and a piston movable within said cylinder and connected to said crankshaft between the ends thereof, a starter disposed adjacent one end of said crankshaft, an impeller flywheel carried by said end of the crankshaft adjacent the starter and disposed to receive air on the side opposite said starter and discharge the same radially for cooling said cylinder, a scroll member carrying said starter and enclosing said impeller to receive the air therefrom, and a cast crankcase member supporting said scroll member and having openings admitting air to said impeller.

5. An internal combustion engine comprising a crankshaft, a piston connected to said crankshaft, an air-cooled cylinder carrying said piston, an engine magneto operably mounted near one end of said crankshaft, a starter unit disposed adjacent said end of said crankshaft to engage selectively the same for starting the engine, and an impeller-flywheel mounted upon said end of said crankshaft between said magneto and said starter unit and disposed to receive air into the side thereof adjacent said magneto and discharge the same radially for cooling said cylinder.

6. An internal combustion engine comprising a crankshaft, a piston connected to said crankshaft, an air-cooled cylinder carrying said piston, an engine magneto operably mounted near one end of said crankshaft, a starter unit disposed adjacent said end of said crankshaft to engage selectively the same for starting the engine, an impeller-flywheel mounted upon said end of said crankshaft and disposed to receive air into the side thereof adjacent said magneto and discharge the same radially for cooling said cylinder, a crankcase supporting said crankshaft and providing a cowl surrounding said magneto and having screened openings admitting air to said impeller, and a scroll member removably secured to said cowl carrying said starter unit and enclosing said impeller to receive the discharged air therefrom and direct the air over said cowl to said cylinder.

7. In an internal combustion engine including a crankshaft, and a crankcase having a fuel induction port, a fuel charge forming device operated by said crankshaft and carried by said crankcase to communicate with said port, and an air filter intake device carried by said crankcase to communicate with said charge forming device, said devices being independently removable from said crankcase.

8. In an internal combustion engine including a crankshaft and an air and fuel induction system, a cylindrical air filter unit having open ends receiving the air passing outwardly through said unit, and a crankcase for said crankshaft carrying said filter unit in operative communication with said induction system.

9. In an internal combustion engine having a crankcase member and air carbureting means carried by said crankcase, a cylindrical filter housing removably secured to said crankcase and having a discharge opening disposed to register with said carbureting means, and a cylindrical filter unit having open ends and carried at one end within said filter housing and at the other end by said crankcase member.

10. An internal combustion engine having an induction system and comprising separable crankcase members, a cover member adjoining one of said crankcase members and providing therewith a transmission gear case, and fuel charge forming means carried by one of said gear case members and communicating with the induction system of the engine.

11. An internal combustion engine having an induction system and comprising separable crankcase members, a cover member adjoining one of said crankcase members and providing therewith a transmission gear case, and fuel charge forming means carried by and operated from said transmission gear case members and communicating with the induction system of the engine.

12. A two-cycle, internal combustion engine comprising separable crankcase members providing a combined crank and fuel induction chamber and having complementary recesses in adjoining walls thereof providing a fuel intake passage to the chamber.

13. In a two-cycle internal combustion engine including a crankshaft having at least one crank, separable crankshaft supporting members providing a crank and fuel charge precompression chamber and having an intake passage, a transmission gear case member adjoining one of said crank shaft supporting members and providing therewith a transmission gear case, and fuel charge forming means carried by the last named crankshaft supporting member connected in operative driving relation with said crankshaft through said transmission gear case and communicating with said crank chamber through said passage for delivery of the fuel charge thereto.

14. An internal combustion engine comprising a crankshaft having a crank intermediate its ends, a piston connected to the crank of said crankshaft, an air-cooled cylinder operatively carrying said piston therein, a crankcase carrying said cylinder and enclosing the crank of said crankshaft with said crankshaft passing through the end walls of said crankcase and journaled in bearings therein, a magneto operably mounted on the outside of one end wall of the crankcase and on the crankshaft adjacent the bearing thereof, an impeller-flywheel mounted upon said crankshaft between the end thereof and said magneto, and a casing for said magneto and impeller secured to said crankcase and having a large screened inlet opening for air circumferential of said magneto and a scroll having a lateral discharge opening facing said cylinder and adapted to receive air from the impeller, whereby air first passes over said magneto as it enters the impeller and then passes toward and around the cylinder to cool the same.

15. The structure of claim 14 in which a rewind starter is carried by said casing and adapted to selectively lock with the end of said shaft on the side of said impeller opposite said magneto.

16. A two-cycle internal combustion engine employing crankcase pre-compression of fuel and comprising a crankcase adapted to receive carbureted fuel, fuel carbureting means carried by said crankcase and in communication therewith, a casing removably secured to and forming with a part of said crankcase a filter housing communicating with said carbureting means, and a cylindrical filter unit having open ends and being adapted to pass air radially outwardly through the walls thereof, said filter housing having open ends which support the corresponding open ends of the filter and provide for the passage of air into the filter.

ELMER C. KIEKHAEFER.

REFERENCES CITED

The following references are of record in the file of this patent:

UNITED STATES PATENTS

| Number | Name | Date |
| --- | --- | --- |
| Re. 21,679 | Jacobi | Dec. 31, 1940 |
| 1,219,377 | Davidson | Mar. 13, 1917 |
| 1,474,467 | Ferguson | Nov. 20, 1923 |
| 1,513,335 | Massey | Oct. 28, 1924 |
| 1,591,032 | Fopay | July 6, 1926 |
| 1,733,361 | Rice, Jr. | Oct. 29, 1929 |
| 1,876,956 | Kastler | Sept. 13, 1932 |
| 2,069,315 | Irgens | Feb. 2, 1937 |
| 2,177,199 | Lansing | Oct. 24, 1939 |
| 2,270,597 | Merrell | Jan. 20, 1942 |
| 2,333,419 | Fitch | Nov. 2, 1943 |
| 2,438,669 | Krenzke | Mar. 30, 1948 |
| 2,459,594 | Smith | Jan. 18, 1949 |